United States Patent
Wang et al.

(10) Patent No.: US 7,898,582 B2
(45) Date of Patent: Mar. 1, 2011

(54) IMAGE NOISE REDUCTION METHOD BASED ON OPTIMAL PRIMARY-COLOR SIGNAL

(75) Inventors: Hsin-Te Wang, Caotun Township (TW); Chen-Hung Chan, Jhongli (TW)

(73) Assignee: Altek Corporation, Hsinchu (TW)

( * ) Notice: Subject to any disclaimer, the term of this patent is extended or adjusted under 35 U.S.C. 154(b) by 573 days.

(21) Appl. No.: 12/100,430

(22) Filed: Apr. 10, 2008

(65) Prior Publication Data

US 2009/0167902 A1    Jul. 2, 2009

(30) Foreign Application Priority Data

Dec. 31, 2007   (TW) ................. 96151600 A

(51) Int. Cl.
*H04N 5/217* (2011.01)
(52) U.S. Cl. ....................................... 348/241
(58) Field of Classification Search ............ 348/241, 348/278, 279, 280, 281, 282, 283
See application file for complete search history.

(56) References Cited

U.S. PATENT DOCUMENTS

| 4,992,876 A | * | 2/1991 | Nishizawa et al. | 348/241 |
| 5,285,277 A | * | 2/1994 | Min | 348/607 |
| 5,432,869 A | * | 7/1995 | Matsumoto et al. | 382/274 |

* cited by examiner

*Primary Examiner* — David L Ometz
*Assistant Examiner* — Akshay Trehan
(74) *Attorney, Agent, or Firm* — Stevens & Showalter LLP

(57) ABSTRACT

An image noise reduction method based on an optimal primary-color signal is suitable for a digital camera to reduce noises in a digital image. The image noise reduction method mainly includes the following steps, taking out primary-color signals of a digital image, including taking out high-frequency and low-frequency signals of the optimal primary-color signal and high-frequency and low-frequency signals of the worst primary-color signal by using a high-pass filter and a low-pass filter; next, mixing the high-frequency signal of the optimal primary-color signal with that of the worst primary-color signal, and superposing the mixed signal to the low-frequency signal of the worst primary-color signal, so as to get a digital image signal after noise reduction.

8 Claims, 5 Drawing Sheets

310

320

330

IMAGE NOISE REDUCTION METHOD BASED ON OPTIMAL PRIMARY-COLOR SIGNAL

CROSS-REFERENCE TO RELATED APPLICATIONS

This non-provisional application claims priority under 35 U.S.C. §119(a) on Patent Application No(s). 096151600 filed in Taiwan, R.O.C. on Dec. 31, 2007, the entire contents of which are hereby incorporated by reference.

BACKGROUND OF THE INVENTION

1. Field of the Invention

The present invention relates to an image noise reduction method. More particularly, the present invention relates to an image noise reduction method based on an optimal primary-color signal.

2. Related Art

The shooting quality of a digital camera is dependent upon the photosensitivity of a photosensitive element, such as charge coupled device (CCD), complementary metal-oxide semiconductor (CMOS). However, when the digital camera shoots in a high ISO mode, image noises are unavoidably generated, which are generally spots distributed randomly. Currently, many digital cameras have noise reduction function to reduce the noises of the shot image when the digital camera is in the high ISO mode. Most of the current image-sensing elements have different sensitivities for different primary colors, or they may need a white balance treatment due to the influences of the color of the ambient lights, and the gain compensation is applied to each primary color after taking out the signal, such that each primary color achieves optimal signal strength. However, due to the different gain compensations for the primary colors, the amplification ratios of the noises are different for the primary-color signals. The greater the gain is, the greater the noises of the primary are. In order to make the signal-to-noise ratio of the worse primary color to approach that of the better primary color as much as possible, an algorithm of removing the noises in the color difference domain has been proposed in the part. According to the algorithm, with the optimal primary-color signal as a center, a difference value from other primary-color signals are generated, and then a fuzzy operation or a neutralization operation is performed on the difference values, and finally the difference value is restored.

However, the method of processing the noises of the digital image based on the color difference domain still faces the problem that the image details cannot be reserved due to improper treatments on the image characteristics. Especially, when the noises are rather large, the reservation of the image details becomes extremely difficult. If the image details are required to be reserved, a great deal of computations is generally needed. Merely for the noise reduction in the color difference domain, the effect for improving the image noises is limited.

SUMMARY OF THE INVENTION

In view of the above problems that the noise reduction for the digital image consumes the computation resources and the image details cannot be reserved due to improper treatments on the image characteristics, the present invention is directed to an image noise reduction method based on an optimal primary-color signal, suitable for a digital camera to amend the worse primary-color signal through the primary-color signal with the optimal signal-to-noise ratio, so as to reduce the noise spots of the digital image.

In order to achieve the above objective of noise reduction, the present invention provides an image noise reduction method based on an optimal primary-color signal, which includes the following steps.

First, a digital image is loaded, and a plurality of primary-color signals of the digital image is taken out. Next, an optimal primary-color signal is selected from the primary-color signals and then decomposed into a high-frequency signal and a low-frequency signal by using a high-pass filter and low-pass filter. Then, a worst primary-color signal is selected from the primary-color signals and then decomposed into a high-frequency signal and a low-frequency signal. Then, the high-frequency signal of the optimal primary-color signal is mixed with that of the worst primary-color signal, and then, the mixed signal is superposed to the low-frequency signal of the worst primary-color signal, so as to get a digital image signal after noise reduction.

In the image noise reduction method based on an optimal primary-color signal according to a preferred embodiment of the present invention, the primary-color signals are red primary-color signals, green primary-color signals, or blue primary-color signals.

In the image noise reduction method based on an optimal primary-color signal according to a preferred embodiment of the present invention, the low-pass filter may be an average filter or a Gaussian filter, and the high-pass filter may be a filter capable of subtracting a signal obtained after an original image signal is low-pass filtered from the original image signal.

The present invention is further directed to an image noise reduction method based on an optimal primary-color signal, in which a weight value is set by means of a low-frequency part of the primary-color signals, such that the worse primary-color signal obtains a preferred signal-to-noise ratio, and the details of the primary-color signals are reserved.

In order to achieve the above objective of noise reduction, the present invention provides an image noise reduction method based on an optimal primary-color signal, which includes the following steps.

First, a digital image is loaded, and a plurality of primary-color signals in the digital image is taken out. Next, an optimal primary-color signal is selected from the primary-color signals and decomposed into a high-frequency signal and a low-frequency signal by using a high-pass filter and a low-pass filter. Then, a worst primary-color signal is selected from the primary-color signals and decomposed into a high-frequency signal and a low-frequency signal. Then, according to the strength of the low-frequency signals of the optimal primary-color signal and the worst primary-color signal, a signal mixing weight ratio is set; and then, according to the signal mixing weight ratio, the high-frequency signal of the optimal primary-color signal is mixed with that of the worst primary-color signal. Then, the mixed signal is superposed to the low-frequency signal of the worst primary-color signal, so as to get a digital image signal after noise reduction.

In view of the above, in the image noise reduction method based on an optimal primary-color signal of the present invention, the primary-color signals in the digital image are decomposed into high-frequency signals and low-frequency signals, and the optimal primary-color signal with the optimal signal-to-noise ratio is used to amend the other worse primary-color signals, and the high-frequency parts of the worse primary-color signals are replaced with reference to the strength of the low-frequency signals of the primary-color signals, so as to achieve the effect of reducing the noise spots in the digital image, without making the digital image fuzzy.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The objectives and features of the present invention are described below in detail through the following preferred embodiments. However, the concept of the present invention is also applicable for other scopes. Hereinafter, the exemplified embodiments are merely intended to illustrate the objects of the present invention and the implementation manner thereof, but not to restrict the scope of the present invention.

First Embodiment

Figure 1:
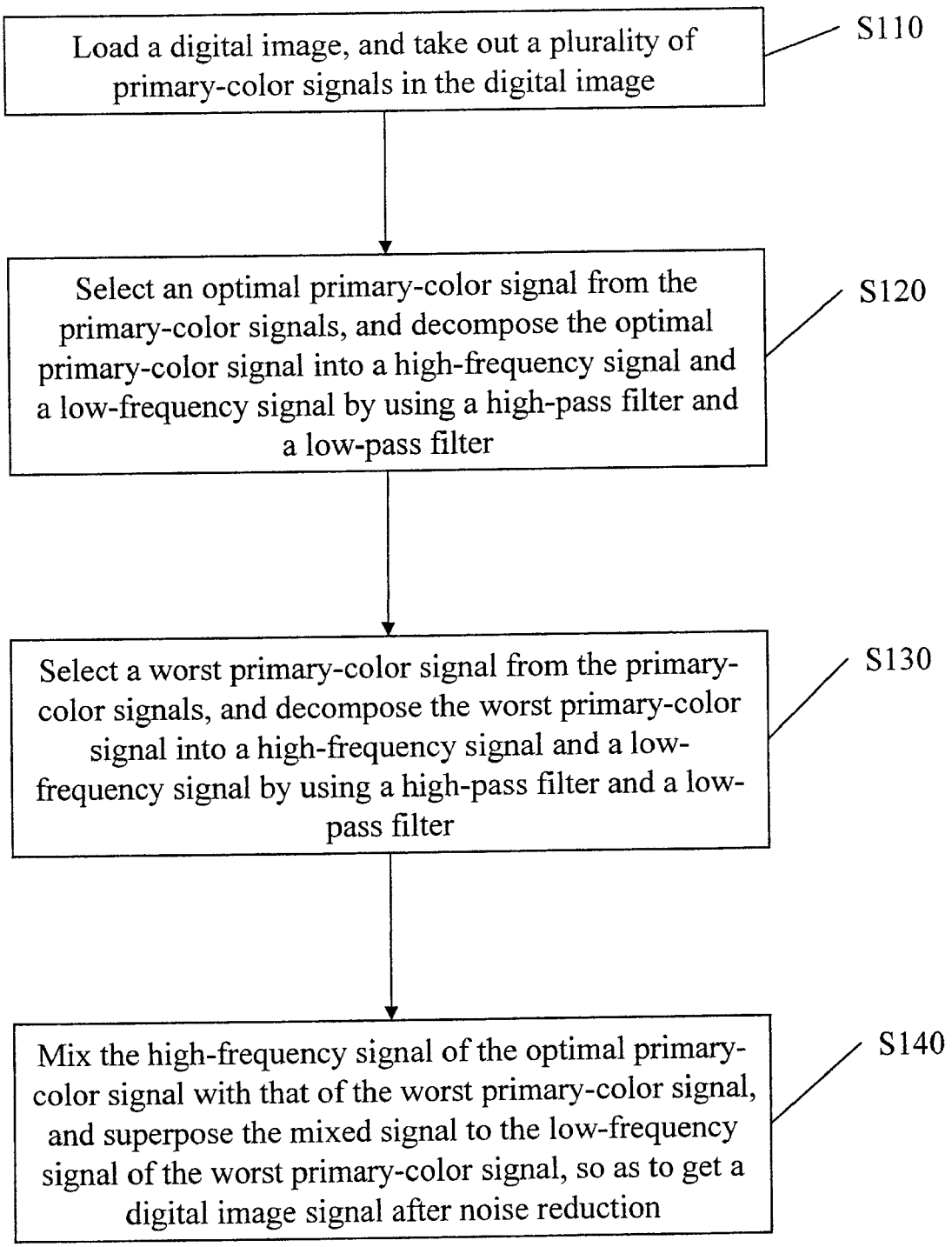
FIG. 1 is a flow chart of an image noise reduction method based on an optimal primary-color signal according to a preferred embodiment of the present invention.

FIG. 1 is a flow chart of an image noise reduction method based on an optimal primary-color signal according to a preferred embodiment of the present invention. Referring to FIG. 1, in this embodiment, a digital camera is used to perform the image noise reduction method to reduce the noises in a digital image. The image noise reduction method based on an optimal primary-color signal includes the following steps.

First, a digital image is loaded and a plurality of primary-color signals in the digital image is taken out (Step S110). Next, an optimal primary-color signal is selected from the primary-color signals and then decomposed into a high-frequency signal and a low-frequency signal by using a high-pass filter and a low-pass filter (Step S120). Then, a worst primary-color signal is selected from the primary-color signals and then decomposed into a high-frequency signal and a low-frequency signal by using a high-pass filter and a low-pass filter (Step S130). Finally, the high-frequency signal of the optimal primary-color signal is mixed with that of the worst primary-color signal, and then the mixed signal is superposed to the low-frequency signal of the worst primary-color signal, so as to get a digital image signal after noise reduction (Step S140).

The primary-color signals are, for example, red primary-color signals, green primary-color signals, or blue primary-color signals. Furthermore, the low-pass filter is an average filter or a Gaussian filter, and the high-pass filter is a filter capable of subtracting a signal obtained after an original image signal is low-pass filtered from the original image signal.

Figure 2:
FIG. 2 is a waveform diagram of a better primary-color signal according to a preferred embodiment of the present invention.
Figure 2:
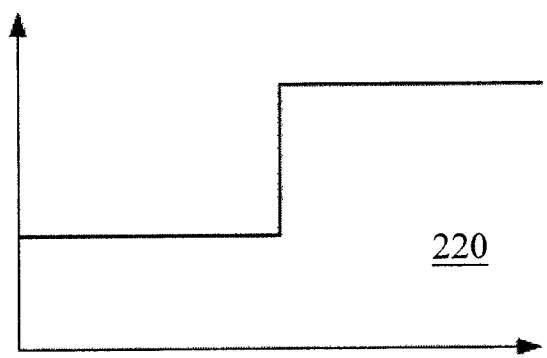
Figure 2:
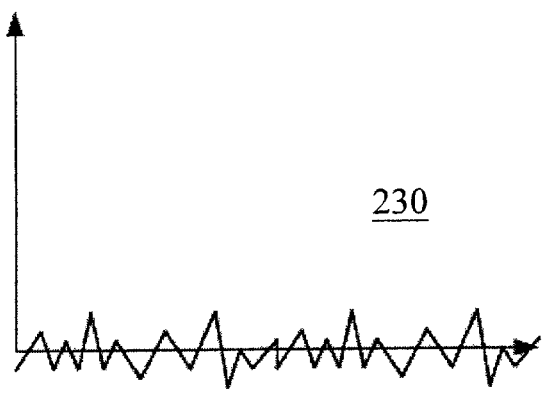

In order to clearly describe this embodiment, the waveform of the primary-color signals is demonstrated. FIG. 2 is a waveform diagram of a better primary-color signal according to a preferred embodiment of the present invention. Referring to FIG. 2, the original data of the digital image is expressed, for example, in the RGB format or YUV format in a spatial domain expression mode, and thus, after reading in three-primary-color signals, a waveform diagram of oscillated three-primary-color signals is obtained. First, it is determined which is a worse primary-color signal and which is a better primary-color signal in the three-primary-color signals in the following way that the worse primary-color signal has a more oscillated waveform, and the better primary-color signal has a less oscillated waveform.

Figure 3:
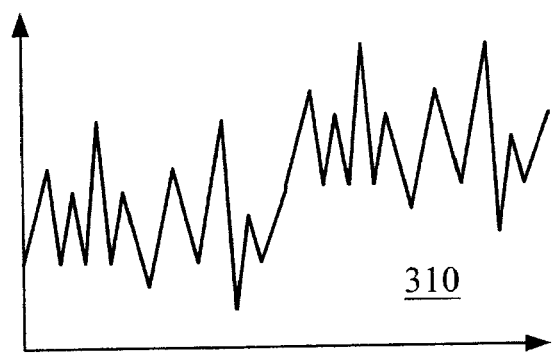
FIG. 3 is a waveform diagram of a worse primary-color signal according to a preferred embodiment of the present invention.
Figure 3:
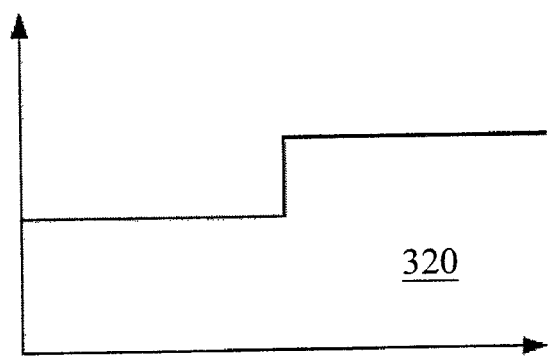
Figure 3:
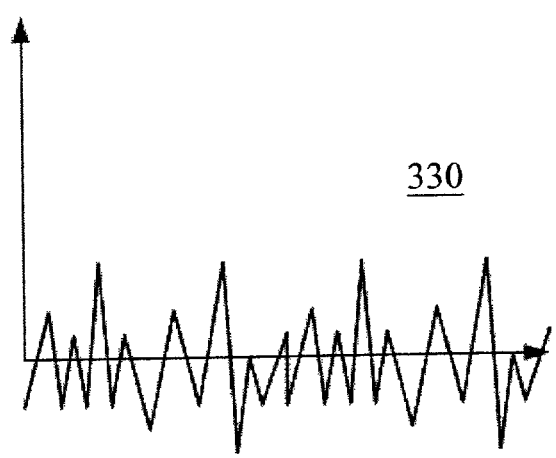

An optimal primary-color signal 210 is taken out from the three-primary-color signals, and then decomposed into a low-frequency part 220 of the optimal primary-color signal by a low-pass filter (LPF), such as an average filter or a Gaussian filter, and meanwhile decomposed into a high-frequency part 230 of the optimal primary-color signal by a high-pass filter (HPF), such as a filter capable of subtracting a signal obtained after an original image signal is low-pass filtered from the original image signal. Similarly, after the optimal primary-color signal 210 is decomposed into the low-frequency part 220 and the high-frequency part 230, the worst primary-color signal is parsed. FIG. 3 is a waveform diagram of a worse primary-color signal according to a preferred embodiment of the present invention. Referring to FIG. 3, similarly, the low-frequency part 320 and the high-frequency part 330 of the worst primary-color signal are taken out from the worst primary-color signal 310 by filters.

Figure 4:
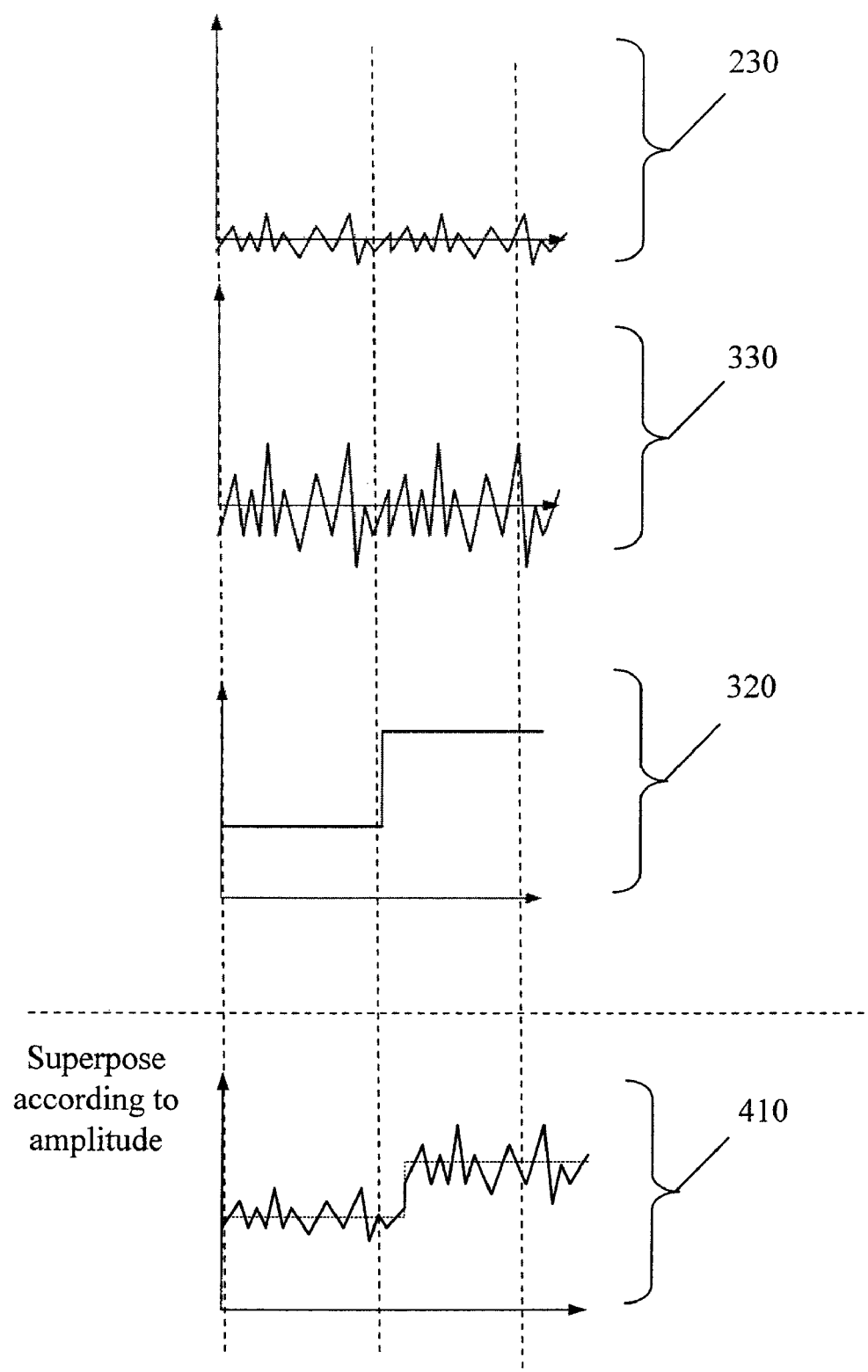
FIG. 4 is a waveform diagram generated by an image noise reduction method based on an optimal primary-color signal according to a preferred embodiment of the present invention.

After respectively taking out the high-frequency part and the low frequency part of the optimal primary-color signal and the worst primary-color signal, the high-frequency part of the worse primary-color signal is replaced by the high-frequency part of the optimal primary-color signal, with reference to the strength of the low-frequency signals of the primary colors. FIG. 4 is a waveform diagram generated by an image noise reduction method based on an optimal primary-color signal according to a preferred embodiment of the present invention. Referring to FIG. 4, first, the high-frequency part 230 of the optimal primary-color signal is mixed with the high-frequency part 330 of the worst primary-color signal (i.e., superposing according to the amplitude of the waveform), so as to get a transition waveform (not shown). After the waveforms are mixed into the transition waveform (not shown), the low-frequency part 320 of the worst primary-color signal is further taken as a reference, and with the low-frequency part 320 as a base, the transition waves is superposed to the low-frequency part, such that the superposed transition waveform is adjusted into a digital image signal 410 after noise reduction.

Second Embodiment

Figure 5:
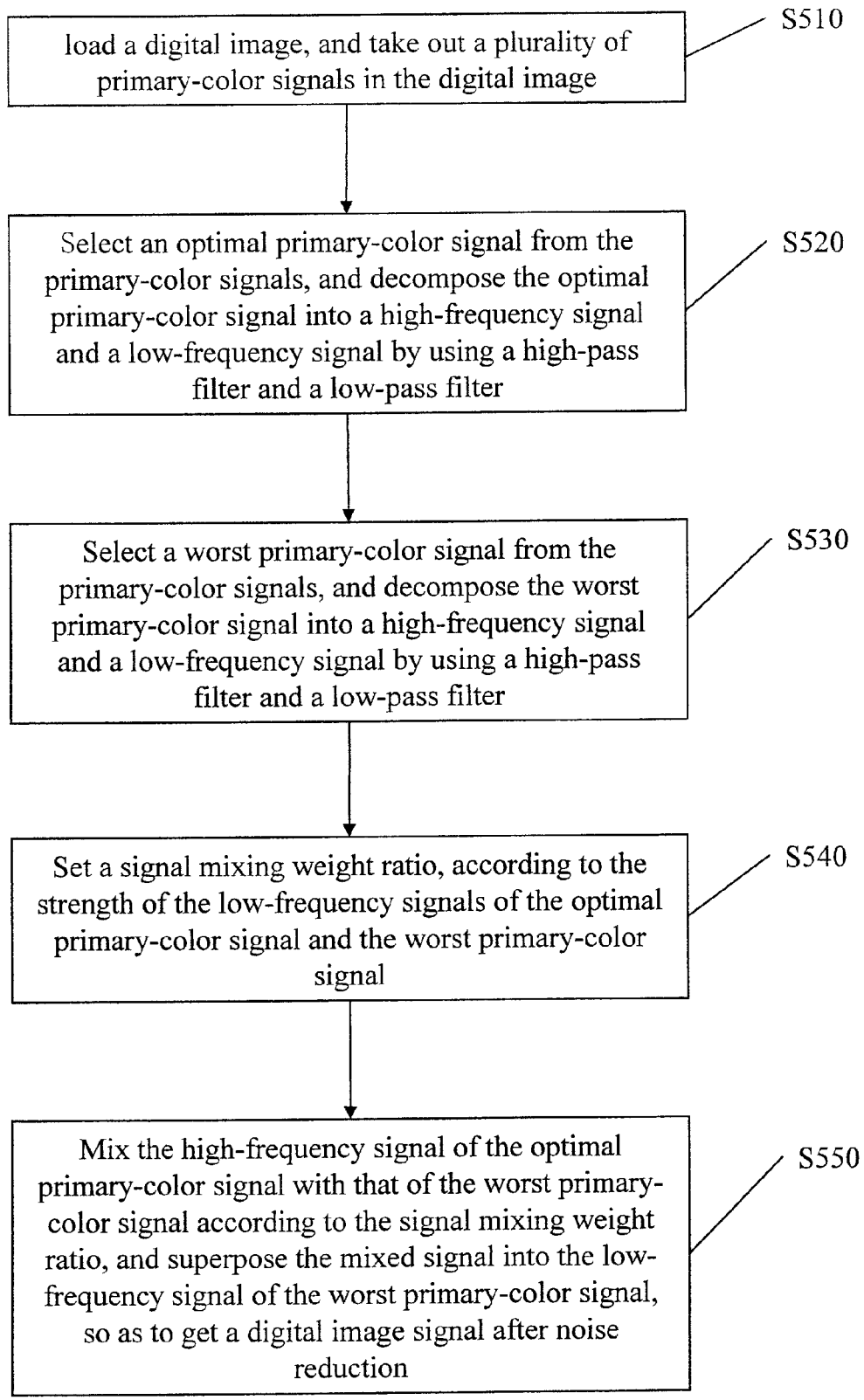
FIG. 5 is a flow chart of an image noise reduction method based on an optimal primary-color signal according to another preferred embodiment of the present invention.

FIG. 5 is a flow chart of an image noise reduction method based on an optimal primary-color signal according to another preferred embodiment of the present invention. Referring to FIG. 5, the implementation mode of this embodiment is similar to that of the first embodiment, and the difference there-between merely lies in that, in this embodiment, a signal mixing weight ratio is further set for adjusting the waveform mix ratio. As the primary-color signals (the red primary-color signals, green primary-color signals, or blue primary-color signals) are made gain compensations at different ratios, the resulted base waveforms of the primary-color signals are different (i.e., the waveforms of the low-frequency signals are different). Therefore, when replacing the high-frequency part of the worse primary-color signal with the low-frequency part of the better primary-color signal, the signal mixing weight ratio is set according to the strength of the low-frequency signals of the better primary-color signal and the worse primary-color signal, so as to maintain the details of the original signal, such that the digital image after noise reduction is clearer.

The image noise reduction method based on an optimal primary-color signal includes the following steps: loading in a digital image, and taking out a plurality of primary-color signals in the digital image (Step S510); next, selecting an optimal primary-color signal from the primary-color signals, and decomposing the optimal primary-color signal into a high-frequency signal and a low-frequency signal by using a high-pass filter and a low-pass filter (Step S520); then, selecting a worst primary-color signal from the primary-color signals, and decomposing the worst primary-color signal into a high-frequency signal and a low-frequency signal by using a high-pass filter and a low-pass filter (Step S530); then, according to the strength of the low-frequency signals of the optimal primary-color signal and the worst primary-color signal, setting a signal mixing weight ratio (Step S540); and finally, according to the signal mixing weight ratio, mixing the high-frequency signal of the optimal primary-color signal with that of the worst primary-color signal, and superposing the mixed signal to the low-frequency signal of the worst primary-color signal, so as to get a digital image signal after noise reduction (Step S550).

What is claimed is:

1. An image noise reduction method based on an optimal primary-color signal, applied for a digital camera to reduce noises in a digital image, comprising:
    loading a digital image, and taking out a plurality of primary-color signals of the digital image;
    selecting an optimal primary-color signal from the primary-color signals, and decomposing the optimal primary-color signal into a high-frequency signal and a low-frequency signal by using a high-pass filter and a low-pass filter;
    selecting a worst primary-color signal from the primary-color signals, and decomposing the worst primary-color signal into a high-frequency signal and a low-frequency signal by using a high-pass filter and a low-pass filter; and
    mixing the high-frequency signal of the optimal primary-color signal with that of the worst primary-color signal, and superposing the mixed signal to the low-frequency signal of the worst primary-color signal, so as to get a digital image signal after noise reduction.

2. The image noise reduction method based on an optimal primary-color signal as claimed in claim 1, wherein the primary-color signals are selected from a group consisting of red primary-color signals, green primary-color signals, and blue primary-color signals.

3. The image noise reduction method based on an optimal primary-color signal as claimed in claim 1, wherein the low-pass filter is an average filter or a Gaussian filter.

4. The image noise reduction method based on an optimal primary-color signal as claimed in claim 1, wherein the high-pass filter is a filter capable of subtracting a signal obtained after an original image signal is low-pass filtered from the original image signal.

5. An image noise reduction method based on an optimal primary-color signal, applied for a digital camera to reduce noises in a shot digital image, comprising:
    loading a digital image, and taking out a plurality of primary-color signals of the digital image;
    selecting an optimal primary-color signal from the primary-color signals, and decomposing the optimal primary-color signal into a high-frequency signal and a low-frequency signal by using a high-pass filter and a low-pass filter;
    selecting a worst primary-color signal from the primary-color signals, and decomposing the worst primary-color signal into a high-frequency signal and a low-frequency signal by using a high-pass filter and a low-pass filter;
    according to the low-frequency signals of the optimal primary-color signal and the worst primary-color signal, setting a signal mixing weight ratio; and
    according to the signal mixing weight ratio, mixing the high-frequency signal of the optimal primary-color signal with that of the worst primary-color signal, and superposing the mixed signal to the low-frequency signal of the worst primary-color signal, so as to get a digital image signal after noise reduction.

6. The image noise reduction method based on an optimal primary-color signal as claimed in claim 5, wherein the primary-color signals are selected from a group consisting of red primary-color signals, green primary-color signals, and blue primary-color signals.

7. The image noise reduction method based on an optimal primary-color signal as claimed in claim 5, wherein the low-pass filter is an average filter or a Gaussian filter.

8. The image noise reduction method based on an optimal primary-color signal as claimed in claim 5, wherein the high-pass filter is a filter capable of subtracting a signal obtained after an original image signal is low-pass filtered from the original image signal.

* * * * *